United States Patent
Atkins et al.

(10) Patent No.: US 11,803,948 B2
(45) Date of Patent: Oct. 31, 2023

(54) DISPLAY MANAGEMENT FOR HIGH DYNAMIC RANGE IMAGES

(71) Applicant: Dolby Laboratories Licensing Corporation, San Francisco, CA (US)

(72) Inventors: Robin Atkins, Vancouver (CA); Jaclyn Anne Pytlarz, Santa Clara, CA (US); Elizabeth G. Pieri, Campbell, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 2 days.

(21) Appl. No.: 17/605,557

(22) PCT Filed: Apr. 16, 2020

(86) PCT No.: PCT/US2020/028552
§ 371 (c)(1),
(2) Date: Oct. 21, 2021

(87) PCT Pub. No.: WO2020/219341
PCT Pub. Date: Oct. 29, 2020

(65) Prior Publication Data
US 2022/0164931 A1    May 26, 2022

Related U.S. Application Data

(60) Provisional application No. 62/938,027, filed on Nov. 20, 2019, provisional application No. 62/837,288, filed on Apr. 23, 2019.

(51) Int. Cl.
    *G06T 5/00* (2006.01)
    *G06T 11/00* (2006.01)
    (Continued)

(52) U.S. Cl.
    CPC .... *G06T 5/009* (2013.01); *G06T 2207/10024* (2013.01); *G06T 2207/20016* (2013.01); *G06T 2207/20208* (2013.01)

(58) Field of Classification Search
    CPC ........... G06T 5/009; G06T 2207/10024; G06T 2207/20016; G06T 2207/202; G06T 5/40;
    (Continued)

(56) References Cited

U.S. PATENT DOCUMENTS

| 8,593,480 B1 | 11/2013 | Ballestad |
| 9,292,908 B2 | 3/2016 | Stewart |

(Continued)

FOREIGN PATENT DOCUMENTS

| EP | 3248367 B1 | 8/2018 |
| WO | 2007082562 A2 | 7/2007 |

(Continued)

OTHER PUBLICATIONS

Eilertsen, G. "The High Dynamic Range Imaging Pipeline" Jun. 1, 2018, Sweden, pp. 1-132.

(Continued)

*Primary Examiner* — Wesner Sajous

(57) ABSTRACT

Methods and systems for the display management of HDR video signals are presented. The mapping is based on tone mapping and color volume mapping which map an input signal with an input dynamic range and color volume to a target display with a target dynamic range and color volume. Both a global tone-mapping and precision-mapping methods using pyramid filtering are presented.

15 Claims, 11 Drawing Sheets

(51) Int. Cl.

| | |
|---|---|
| *G06T 7/00* | (2017.01) |
| *G09G 5/02* | (2006.01) |
| *G09G 5/10* | (2006.01) |
| *G09G 5/30* | (2006.01) |
| *H04N 1/60* | (2006.01) |
| *H04N 5/57* | (2006.01) |
| *H04N 9/73* | (2023.01) |
| *H04N 9/77* | (2006.01) |
| *H04N 23/741* | (2023.01) |

(58) Field of Classification Search
CPC .. G06T 2207/20208; G09G 5/02; G09G 5/10; G09G 5/227; G09G 5/30; G09G 2320/02; G09G 2320/0233; G09G 2320/0242; G09G 2320/04; G09G 2320/0271; G09G 2320/0276; G09G 2320/0626; G09G 2320/0653; G09G 2320/066; G09G 2320/0666; G09G 2320/0673; G09G 2320/0693; G09G 2320/10; G09G 2340/0407; G09G 2360/16; G09G 2370/04; H04N 1/54; H04N 1/60; H04N 1/6027; H04N 1/6041; H04N 1/6077; H04N 1/6058; H04N 5/20; H04N 5/202; H04N 5/21; H04N 5/57; H04N 9/73; H04N 9/77; H04N 23/70; H04N 23/71; H04N 23/74; H04N 23/741; H04N 23/86; H04N 25/57; H04N 25/60; H04N 25/611; H04N 25/671; H04N 25/447; H04N 25/42; H04N 19/117; H04N 19/33
See application file for complete search history.

(56) References Cited

U.S. PATENT DOCUMENTS

| | | | |
|---|---|---|---|
| 10,242,627 B2 | 3/2019 | Farrell | |
| 10,839,487 B2 | 11/2020 | Stewart | |
| 11,475,549 B1* | 10/2022 | Kumar | G09G 5/10 |
| 2012/0256943 A1* | 10/2012 | Atkins | G09G 5/10 |
| | | | 345/581 |
| 2015/0235348 A1 | 8/2015 | Sarkar | |
| 2015/0254823 A1* | 9/2015 | Atkins | H04N 21/84 |
| | | | 345/590 |
| 2016/0005153 A1* | 1/2016 | Atkins | H04N 1/60 |
| | | | 345/591 |
| 2016/0005349 A1* | 1/2016 | Atkins | G06T 5/007 |
| | | | 345/591 |
| 2016/0014422 A1 | 1/2016 | Su | |
| 2017/0116931 A1* | 4/2017 | Matsui | G09G 3/36 |
| 2017/0330529 A1* | 11/2017 | Van Mourik | G09G 5/02 |
| 2018/0013927 A1* | 1/2018 | Atkins | H04N 9/68 |
| 2018/0014024 A1 | 1/2018 | Lasserre | |
| 2018/0300862 A1 | 10/2018 | Keating | |
| 2019/0052908 A1* | 2/2019 | Mertens | H04N 19/102 |
| 2019/0311694 A1* | 10/2019 | Van Mourik | H04N 21/4358 |
| 2020/0404343 A1* | 12/2020 | Van Der Vleuten | H04N 19/44 |
| 2021/0174761 A1* | 6/2021 | Van Mourik | H04N 21/23439 |

FOREIGN PATENT DOCUMENTS

| | | |
|---|---|---|
| WO | 2016183239 A1 | 11/2016 |
| WO | 2017158463 A1 | 9/2017 |
| WO | 2017196869 A1 | 11/2017 |
| WO | 2018119161 A1 | 6/2018 |
| WO | 2018152063 A1 | 8/2018 |
| WO | 2018175337 A1 | 9/2018 |
| WO | 2020146655 | 7/2020 |

OTHER PUBLICATIONS

ITU BT. 2100, "Image parameter values for high dynamic range television for use in production and international programme exchange."

Pouli, T. et al. "Color Correction for Tone Reproduction" Color and Imaging Conference, Nov. 1, 2013, pp. 215-220.

Reinhard, E. et al. "Image Display Algorithms for High and Low-Dynamic Range Display Devices" Journal of the society for Information, vol. 15, No. 12, Dec. 1, 2007, pp. 6-7.

* cited by examiner

DISPLAY MANAGEMENT FOR HIGH DYNAMIC RANGE IMAGES

CROSS-REFERENCE TO RELATED APPLICATIONS

This application claims priority to U.S. Provisional Patent Application Ser. No. 62/837,288, filed on Apr. 23, 2019 and U.S. Provisional Patent Application Ser. No. 62/938,027, filed on Nov. 20, 2019, each of which is hereby incorporated by reference in its entirety.

TECHNOLOGY

The present invention relates generally to images. More particularly, an embodiment of the present invention relates to the display management of high-dynamic range (HDR) images and video signals.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). For example, using gamma luminance coding, images where n≤8 (e.g., color 24-bit JPEG images) are considered images of standard dynamic range, while images where n≥10 may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

As used herein, the term "display management" refers to processes that are performed on a receiver to render a picture for a target display. For example, and without limitation, such processes may include tone-mapping, gamut-mapping, color management, frame-rate conversion, and the like.

High Dynamic Range (HDR) content authoring is now becoming widespread as this technology offers more realistic and lifelike images than earlier formats. However, the characteristics of a target display may not match the characteristics of the reference display that was used to color grade the original content. To improve existing display schemes, as appreciated by the inventors here, improved techniques for the display management of HDR images are developed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
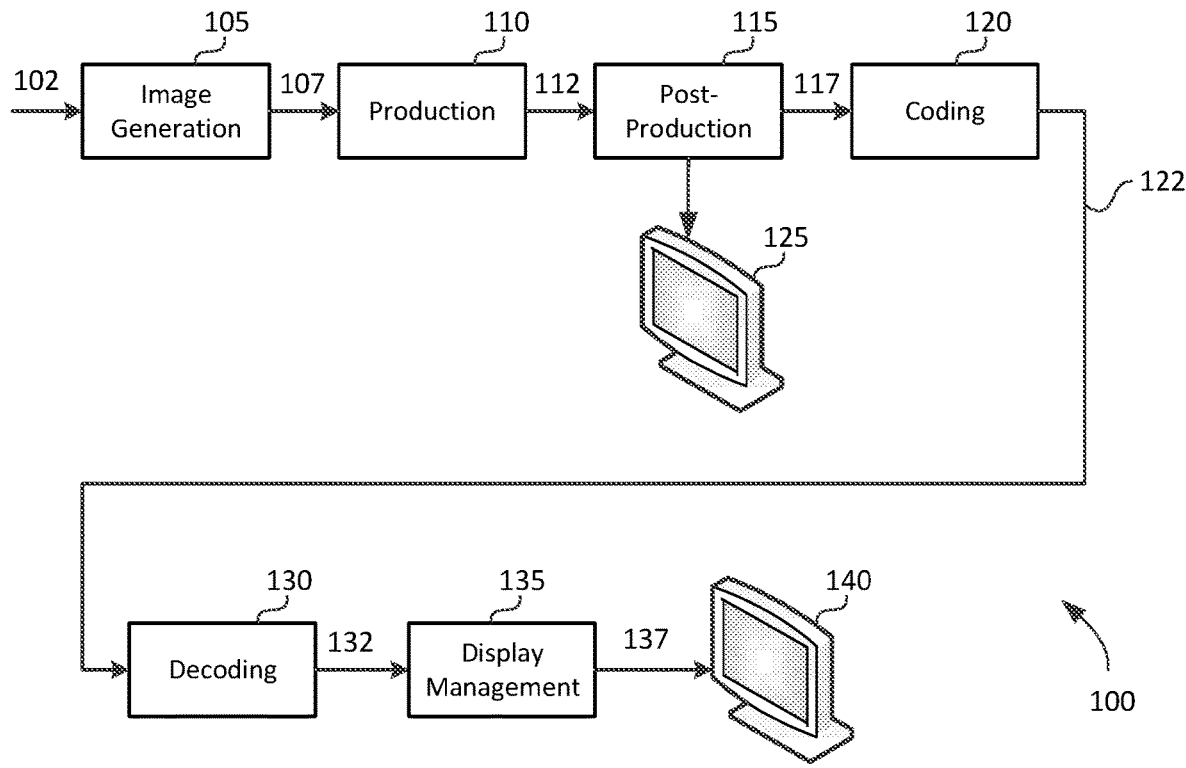
FIG. 1 depicts an example process for a video delivery pipeline.

Methods for the display management of HDR images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to methods for the display management of HDR images. In one embodiment, a processor receives a first image (507) in a first dynamic range and a first spatial resolution, the first image comprising intensity pixels (507-I) and chroma pixels (507-C). It applies a tone-mapping function (615) to the intensity pixels of the first image to generate corresponding intensity pixels (I') of a tone-mapped image in a target dynamic range, wherein the target dynamic range is different than the first dynamic range. It computes a saturation metric for pixels of the first image based on values of the chroma pixels in the first image. It computes (660) a saturation-mapping-intensity (SMI) scaler, wherein the SMI scaler adjusts pixel values of the chroma pixels in the first image according to a function of the corresponding pixels of intensity in the first image and the tone-mapped image. It computes (640) a tone-mapping-saturation (TMS) scaler for the intensity pixels in the tone-mapped image based on a first function of the saturation metric of the chroma pixels in the first image. It computes (645) a saturation-mapping-saturation scaler (SMS) for the chroma pixels in the first image based on a second function of the saturation metric of the chroma pixels in the first image. It applies the TMS scaler to intensity pixels of the tone-mapped image to generate output intensity pixels (I''). It multiplies the SMS and SMI scalers with the chroma pixels of the first image to generate intermediate chroma pixels, and generates an output image (652) comprising the output intensity pixels and output chroma pixels, wherein the output chroma pixels comprise either the intermediate chroma pixels or chroma pixels generated as a function of the intermediate chroma pixels.

Display Management

Video Coding of HDR Signals

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Display Management Pipeline

Figure 2A:
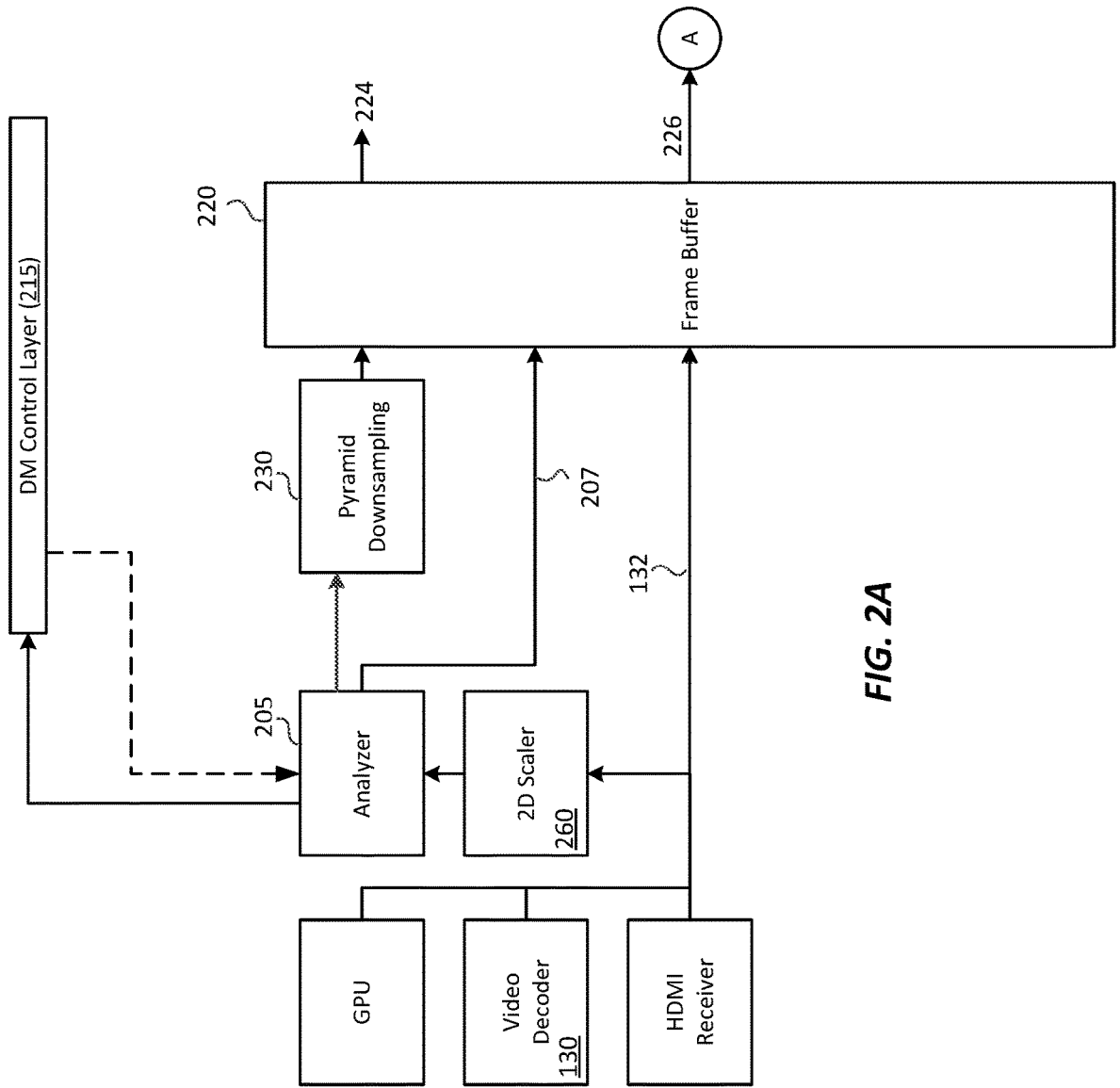
FIG. 2A and FIG. 2B depict an example architecture for display management according to an embodiment of the present invention.
Figure 2B:
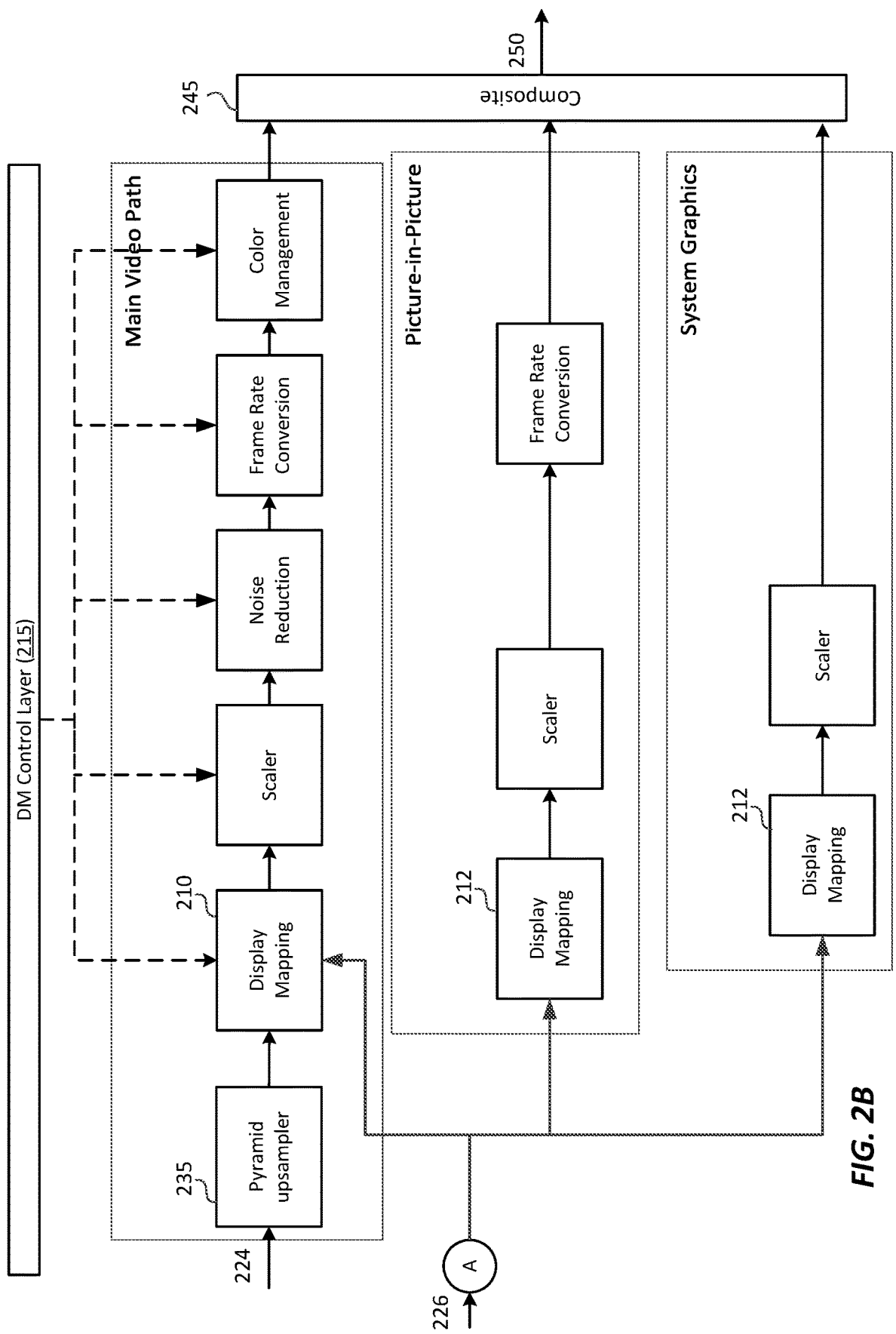

FIG. 2A and FIG. 2B depict an example architecture for display management according to an embodiment. As depicted in FIG. 2A, input video (132) may include video received from a video decoder (130) and/or video received from a graphical processing unit (say, from a set-top box), and/or other video input (say, from an HDMI port in the TV or the set-top box, a graphical processing unit (GPU), and the like). Incoming video (132) may be processed by analyzer (205) and its output may be stored in frame buffer (220). As will be explained in more detail in a subsequent section, the analyzer analyzes the input on a frame by frame basis and may generate metadata, statistical data, or other video-related data to be used in subsequent stages of the architecture. The output of the analyzer may also be processed by a pyramid down-sampling unit (230) (to be described in more detail later), which generates an image pyramid (224). The analyzer may also generate an intensity-only signal (207) which is fed to the frame buffer.

As depicted in FIG. 2B, input video and graphics (226) from the frame buffer may be processed by three video pipelines: the main video pipeline, an optional picture-in-picture (PIP) pipeline, and an optional graphics pipeline. The main video pipeline includes a pyramid up-sampler unit (235) and may include such processing blocks as a display mapping unit (210), scaling circuitry, a denoising unit, and a color management unit. Similarly, the PIP pipeline may include its own display mapping (212) (typically, a subset of display mapping 210), scaling, and frame-rate conversion. Finally, the graphics pipeline may include display mapping (212) and scaling. The output of all three pipelines is combined together by composite unit (245) to generate composite video signal 250, which, after additional color management and post-processing (not shown) is passed to the panel of the target display (not shown). The overall architecture may be controlled by a display management control layer (215). Additional details are provided next.

The Analyzer Unit

Figure 3:
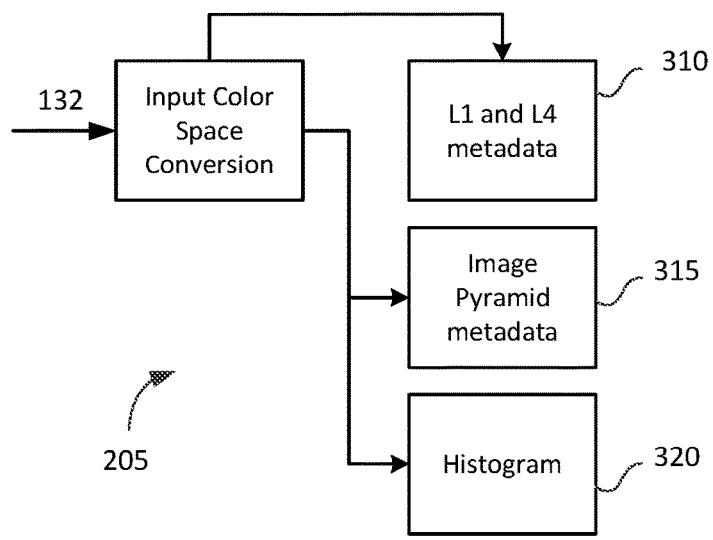
FIG. 3 depicts an example processing pipeline for a frame analyzer unit according to an embodiment of the present invention.

As depicted in FIG. 3, the analyzer unit (205) analyzes an input source frame by frame and generates a variety of outputs, including:
- Min, mid, max metadata values (310) for the frame (also may be referred to as L1 metadata)
- Metadata (310) related to global dimming (also may be referred to as L4 metadata), for example, temporally-filtered L1 metadata; and
- Intensity data (207) and an intensity histogram (320)

The analyzer, in combination with the pyramid down-sampling unit (230) may also generate metadata related to a pyramid representation of the input frame (132), also to be referred to as precision mapping or pyramid filtering metadata (224).

In an embodiment, the analyzer may operate in a reduced resolution of the input frame to reduce computational complexity. For example, in an embodiment the analyzer may only operate on sub-sampled data at a resolution of 1024×576, or smaller, as generated by a 2D scaler (260).

Figure 4:
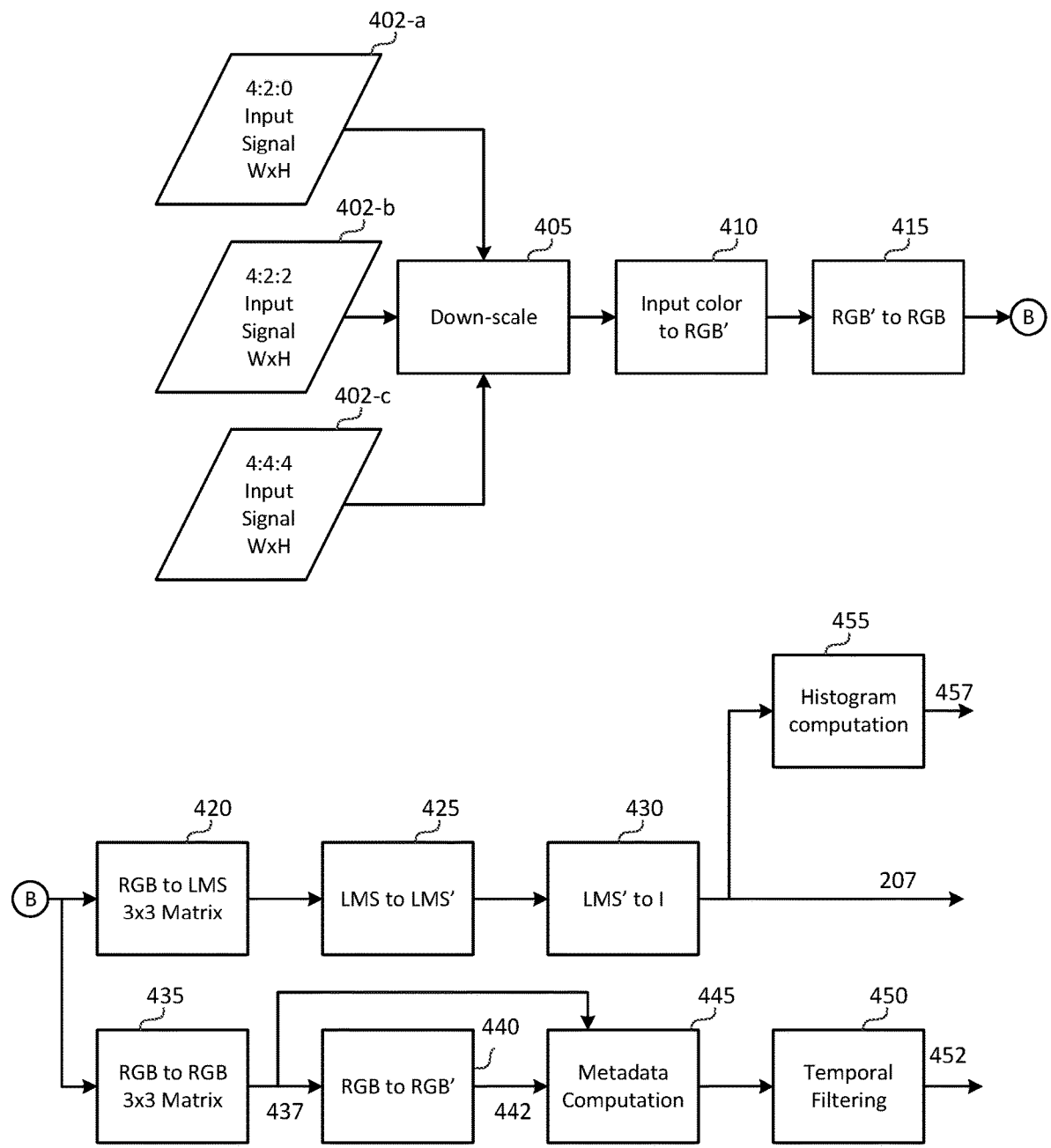
FIG. 4 depicts in more detail the color-conversion processing pipeline for the frame analyzer unit of FIG. 3, according to an embodiment of the present invention.

FIG. 4 depicts additional details related to the analyzer unit. As depicted in FIG. 4, video input (402-a, 402-b, or 402-c) is down-sampled by down-sampling unit 405 (e.g., by using 2D scaler 260), which converts all input formats to a 4:4:4 representation at a lower resolution (e.g., less than or equal to 1024×576). In an embodiment, down-sampling unit (405) may take advantage of any down-scaling hardware that may be available in the decoder. Following down-sampling (405), a number of color-conversion stages translate the input color format to the ICtCp color format. Such stages include:

Input format (e.g. ICtCp, YCbCr, YUV, and the like) to non-linear RGB' conversion (410)
Non-linear RGB' to linear RGB conversion (415)
Linear RGB to linear LMS conversion (420)
Linear LMS to non-linear LMS' conversion (425)
Non-linear LMS' to the I component of ICtCp (430)
From a first linear RGB representation to a second linear RGB representation (435); and
Linear RGB to non-linear RGB' conversion (440)

Depending on the input color format, one or more of these stages may be skipped. Examples of color transformations between color spaces for both PQ and HLG-coded data may be found in Rec. BT. 2100, "Image parameter values for high dynamic range television for use in production and international programme exchange," by ITU, which is incorporated herein by reference in its entirety.

Given linear RGB values (437) and non-linear RGB' values 442, the metadata computation block 445 generates a variety of metadata values, such as the minimum pixel value (MinPixel), the maximum pixel value (MaxPixel), the mean or average pixel value (MeanPixel), and the standard deviation (StdPixel) of pixels in a frame, plus additional metadata values as needed for subsequent stages in display management. For example, using pseudocode, the following code may be used to generate these metadata values.
Intialize

```
MinPixel = 1
MaxPixel = 0
Scale = 1 / (Wa x Ha) //Dimensions of input image
m = 0,
m2 = 0,
```

For each image position [x, y]

```
if x >= ROIx1 & x <= ROIx2 & y >= ROIy1 & y <= ROIy2
//ROIx1, ROIx2, ROIy1, and ROIy1 define the Region of interest
{
    tempmin = min( R[ x, y ], G[ x, y ], B[ x, y ] ) >> 4
    tempmax = max( R[ x, y ], G[ x, y ], B[ x, y ] ) >> 4
    if tempmin < MinPixel
    {
        MinPixel = tempmin
    }
    if tempmax > MaxPixel
```

```
    {
        MaxPixel = tempmax
    }
    m = m + tempmax
    m2 = m2 + ( tempmax ) ^ 2
}
```

After each image position is processed, compute

```
MeanPixel  = m * Scale
StdPixel   = sqrt( ( m2 * Scale ) - ( m * Scale ) ^ 2 )
```

Given these metadata, temporal filter (450) filters the MinPixel, MeanPixel, MaxPixel, and StdPixel values to generate filtered metadata values (452). Such temporal filtering, as described in U.S. Pat. No. 10,242,627, "Backlight control and display mapping for high dynamic range images," by S. Farrell et al., takes into consideration scene changes and limits sudden changes in the metadata values, which may result in poor display output, especially when display management takes into consideration the surrounding ambient light. As an example, in an embodiment, the temporal filtering for the mean and standard deviation metadata may be expressed as

```
L4Alpha = CLAMP ( 24/FPS *
            ( abs( FilteredFrameMean – MeanPixel ) * 8 + 0.1 ), 0, 1 )
FilteredFrameMean = FilteredFrameMean * ( 1 – L4Alpha ) +
MeanPixel * L4Alpha
FilteredFrameStd = FilteredFrameStd * ( 1 – L4Alpha ) +
StdPixel * L4Alpha
``` where FPS denotes the frame rate of the incoming signal (e.g., 30 fps), L4Alpha denotes a filtering parameter, and the CLAMP(x, min, max) function restricts the values of x between min and max, as in:

CLAMP(x,min,max)=(x<min)?min:((x>max)?max:x)

Given intensity (I) data (207), histogram computation unit 455 computes their histogram 457.

Pyramid Down-Sampling

As depicted in FIG. 2A, an embodiment includes the pyramid down-sampling unit 230, which generates a pyramid representation (224) of the input frame, to be used later on for improved tone mapping. In some embodiments, layers of the pyramid may be skipped in order to reduce the memory bandwidth. For example, with a 4K input image, the first layer (say, at 2K resolution), could be skipped. Then, during up-sampling, the quarter resolution image would simply be doubled twice. For example, given a 4K input, in an embodiment, the pyramid may generate the following layers: 1024×576, 512×288, 256×144, 128×72, 64×36, 32×18, and 16×9. Similarly, for an 8K input image, both the half and quarter resolution layers may be skipped. This ensures that no matter the input image size, the subsequent layers of the pyramid will have the same dimensions.

While the pyramid is described in terms of sub-sampling using sub-sampling factors 2, 4, 8, and the like, other sub-sampling factors may be used without loss of generality.

As an example, in creating the pyramid, the k-th line at the n-th pyramid layer (e.g., n=2 to 7), is generated by proper filtering of lines **2*k and 2*k−1** at the previous layer. In an embodiment, such filtering is performed using either a separable low-pass 2×2 filter (e.g., with filter coefficients [1

1]/2) or a separable 4×4 low-pass filter (e.g., with filter coefficients [1 3 3 1]/8). The 4×4 filter results in better alignment between the pyramid levels but requires additional line buffers. In another embodiment, one may apply different filters in the horizontal and vertical directions, e.g., a 4-tap horizontal filter and a 2-tap vertical filter, or vice versa.

Figure 7A:
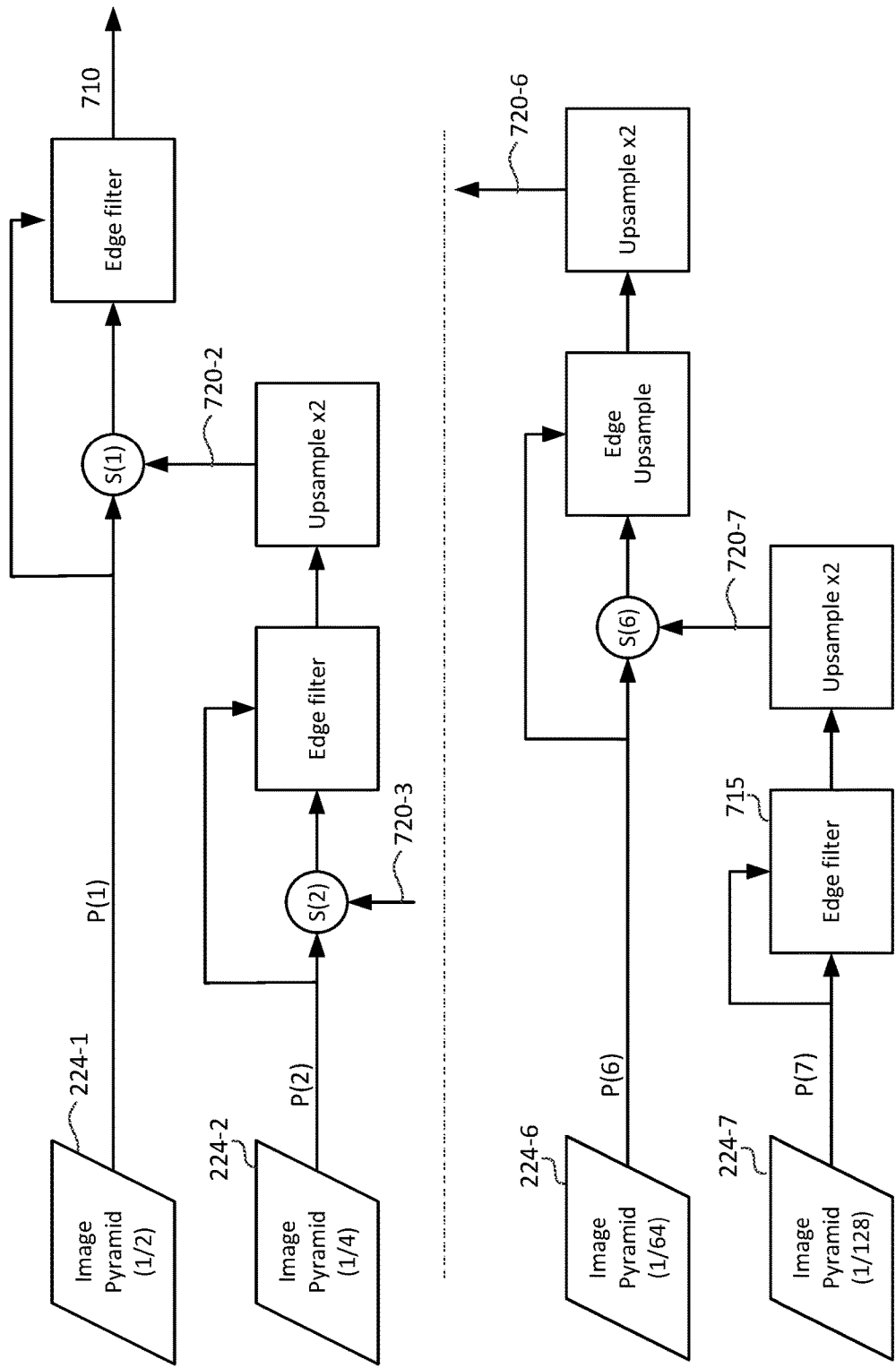
FIG. 7A depicts an example process of generating an up-sampled pyramid image according to an embodiment.

Before computing the first level of the pyramid (e.g., at 1024×576), the input ICtCp image (507) may be padded to:
- guarantee that all spatial dimensions are divisible by two, from the smallest to the largest pyramid levels
- replicate border pixels, taking into account a specified region of interest (ROI)
- replicates border pixels, taking into account input images of various sizes or aspect ratios Pyramid Up-Sampling Pyramid up-sampler (235), receives the down-sampled pyramid data (224-1, 224-2, . . . , 224-7) and reconstructs the original image in its original resolution using, at each layer, an edge-aware up-sampling filter. The smallest level of the pyramid is up-sampled first, then, additional levels are up-sampled, up to the resolution of the highest pyramid level. The overall process for a pyramid with seven layers is depicted in FIG. 7A.

Denote as $P(i)$ the pyramid image at layer i. Starting at the lowest resolution level (e.g., i=7), the lowest resolution pyramid image (e.g., $P(7)$) is fed to an edge-preserving filter (715) which generates two coefficient "images" to be denoted as $Ima(7)$ and $Imb(7)$. Next, both Ima and Imb are up-sampled by a factor of two to generate up-sampled coefficient images $ImaU(7)$ and $ImbU(7)$ (720-7).

At the next layer, i=6, the $P(6)$ layer of the pyramid is combined with the up-sampled coefficient images $ImaU(7)$ and $ImbU(7)$ to generate image $$S(6)=ImaU(7)*P(6)+ImbU(7), \qquad (1)$$

which together with image $P(6)$ are fed to the edge-up sample filter to generate the coefficient "images" $Ima(6)$ and $Imb(6)$. Next, $Ima(6)$ and $Imb(6)$ are up-sampled by a factor of two to generate up-sampled coefficient images $ImaU(6)$ and $ImbU(6)$ (720-6). The same process continues for the other pyramid layers. In general, for i=7, 6, 5, 2, $$S(i-1)=ImaU(i)*P(i-1)+ImbU(i), \qquad (2)$$

where the operation of multiplying a coefficient image with an image corresponds to multiplying pixel by pixel their corresponding pixels. For example, at pixel location (m,n), for a pyramid level i with dimensions $W(i) \times H(i)$, $$S(i-1)_{m,n}=ImaU(i)_{m,n}*P(i-1)_{m,n}+ImbU(i)_{m,n}, \qquad (3)$$

for m=1, 2, . . . , W(i−1) and n=1, 2, . . . , H(i−1).

Figure 7B:
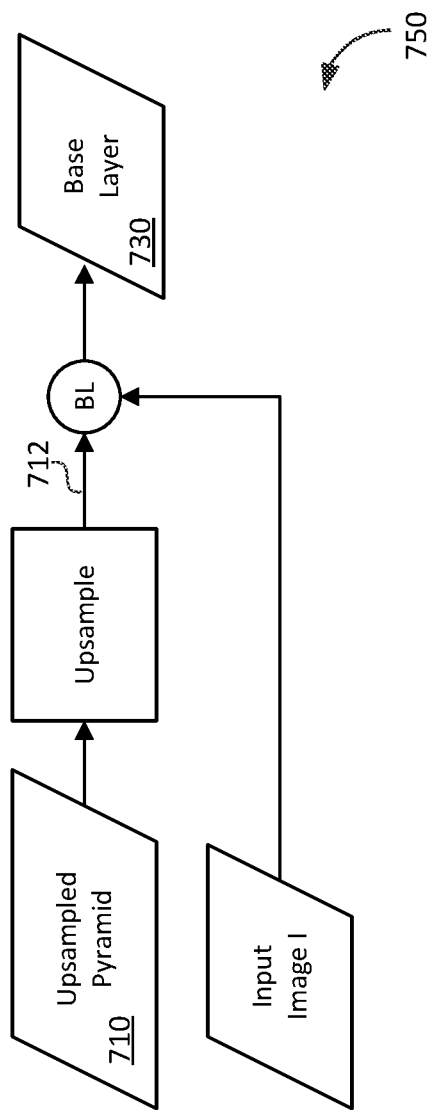
FIG. 7B depicts an example of generating a base-layer image according to an embodiment.

After processing the second level of the pyramid (i=2), given $S(1)$ and $P(1)$, the edge filter will generate two parameter images $Ima(1)$ and $Imb(1)$ (710). To generate a 4K image, $Ima(1)$ and $Imb(1)$ can be upscaled by 2. To generate an 8K image, $Ima(1)$ and $Imb(1)$ can be upscaled by 4. As depicted in FIG. 7B, the two upscaled coefficient images ($ImaU(1)$ and $ImbU(1)$) (712), combined with the intensity image (1) of the input video may be used to generate a filtered base layer image (730), as $$BL=I_F=ImaU(1)*I+ImbU(1). \qquad (4)$$

As will be described later, this filtered base layer image may be used for color volume mapping to generate the final output image.

Generalizing, given a pyramid with N layer pictures (e.g., $P(1)$ to $P(N)$), generating the coefficient images $Ima(1)$ and $Imb(1)$ comprises:

- generate $Ima(N)$ and $Imb(N)$ using an edge filter and $P(N)$, the N-layer pyramid image with the lowest spatial resolution;
- generate $ImaU(N)$ and $ImbU(N)$ by up-scaling $Ima(N)$ and $Imb(N)$ to match the spatial resolution of the N−1 layer;

```
for (i = N-1 to 2) {
    S(i) = ImaU(i + 1) * P(i) + ImbU(i + 1)
    generate Ima(i) and Imb(i) using the edge filter, S(i) and P(i)
}
compute S(1) = ImaU(2) * P(1) + ImbU(2); and
generate Ima(1) and Imb(1) using the edge filter, S(1) and P(1).
```

Figure 7C:
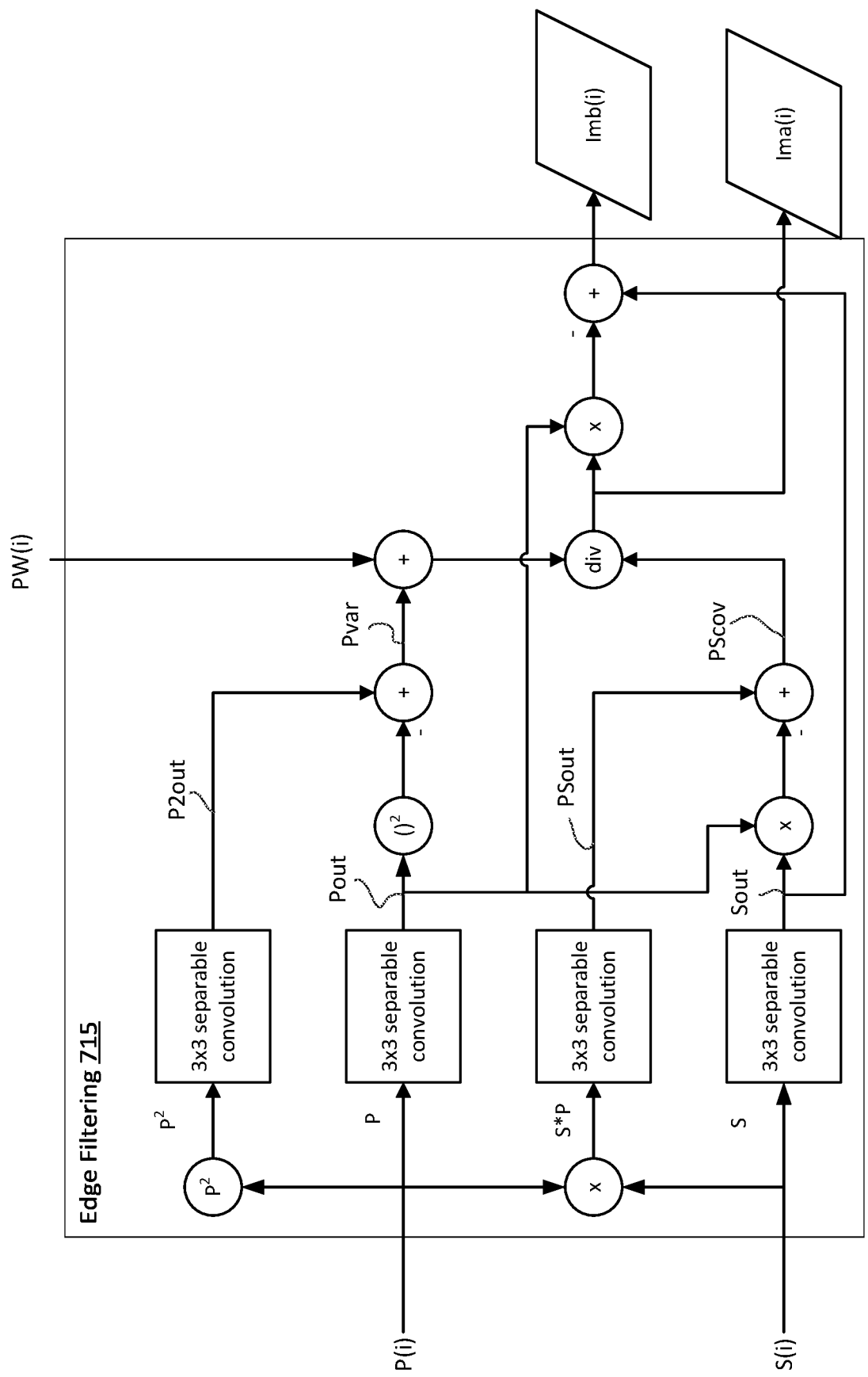
FIG. 7C depicts an example of edge filtering according to an embodiment.

FIG. 7C depicts in more detail the operations inside edge filter (715), which given filtered data $S(i)$, a pyramid layer image $P(i)$, and pyramid weights $PW(i)$ (provided via metadata), generates two coefficient matrices $Ima(i)$ and $Imb(i)$ to be used to preserve edges at the higher pyramid layer. Note that for the pyramid layer N at the lowest spatial resolution, e.g., N=7, $S(N)=P(N)$.

As depicted in FIG. 7C, first, each of the $S(i)$, $P(i)$, $P^2(i)$, and $P(i)*S(i)$ inputs are convolved horizontally and vertically using a 3×3 separable low-pass filter, such as H=[1 2 1]/4. Their corresponding outputs can be denoted as Sout, Pout, P2out, and PSout. While these signals are specific to each layer, for simplicity, the index i is not used. Then, as depicted in FIG. 7C, $$Pvar=P2out-Pout^2,$$

$$PScov=PSout-Sout*Pout,$$

$$Ima(i)=PScov/(Pvar+PW(i)),$$

$$Imb(i)=Sout-Ima(i)*Pout. \qquad (5)$$

The Display Mapping Unit

Figure 5:
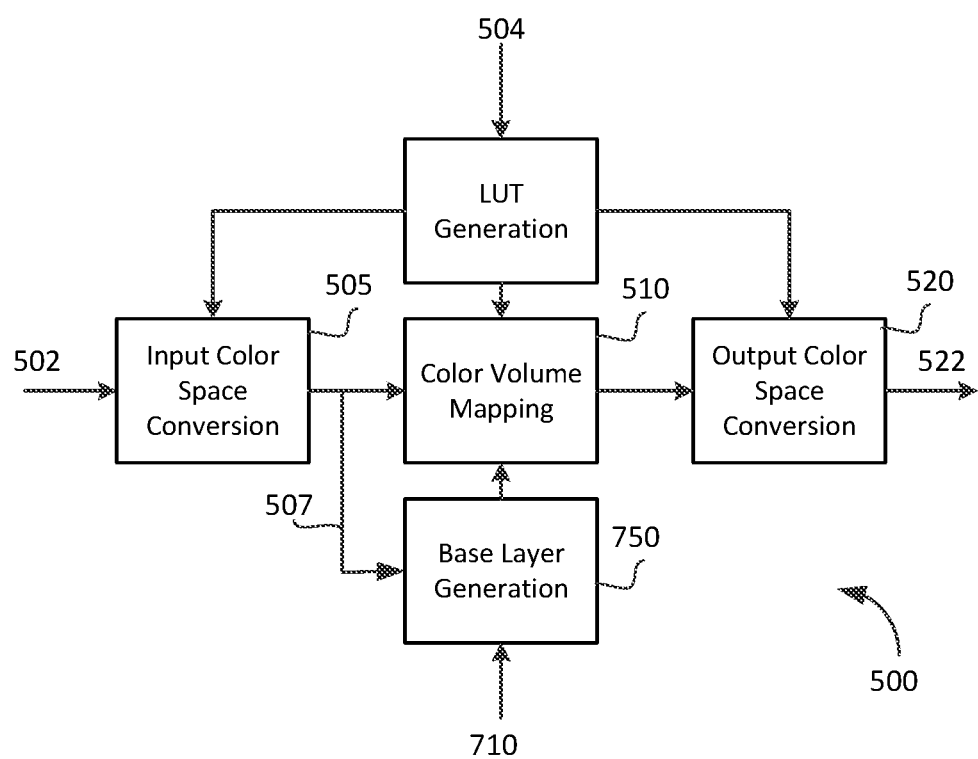
FIG. 5 depicts an example processing pipeline for display mapping according to an embodiment of the present invention.

Given an input image, rendered on a reference display (e.g., 125), and a target display (e.g., 140), the role of the display mapping unit is to generate an output image for the target image that takes full advantage of the characteristics of the target display but also preserves the artistic intend of the original image FIG. 5 depicts an example block diagram of the major components of a display mapping unit according to an embodiment. Inputs to the display mapping unit include: video image data and metadata (502), information about the characteristics of a target display and optional user preferences (504), and optional precision mapping data related to a pyramid representation of the input image (e.g., 224) and the edge filter coefficients from layer one of the pyramid (710), which can be used to improve the tone mapping and color volume mapping operations by generating in the base layer generation unit (750) a base layer image (730) as described earlier and depicted in FIG. 7B. Given these inputs, the display mapping unit (500) generates a mapped image (522) by appropriate tone mapping and/or color mapping (510).

In an embodiment, without limitation, operations related to tone mapping and color mapping (510) may be performed in the ICtCp color space or the ITP color space. Depending on the color formats of the input (502) and the desired output (522), operating in the ICtCp color space may require optional input space conversion (505) and output color conversion (520).

For example, for input color conversion (505), one may follow the same color conversion steps as those depicted in FIG. 4. For example, YCbCr to ICtCp color conversion may apply the following steps:
- YUV to non-linear RGB' (410)
- Non-linear RGB' to linear RGB (415)
- Linear RGB to linear LMS (420)
- Linear LMS to non-linear LMS' (425); and
- Non-linear LMS' to ICtCp (507)

For output color conversion, as an example, the following processing steps may be followed:
- ICtCp to non-linear LMS'
- Non-linear LMS' to linear LMS
- Linear LMS to linear RGB (522)
- Linear RGB to non-linear RGB' (The non-linear RGB' can be used for devices requiring non-linear RGB' input)
- Non-linear RGB' to YUV (or YCbCr) for devices requiring YCbCr input As an example, Rec. BT. 2100 provides examples of recommended color transformations between color formats for both PQ and HLG-coded data.

In some embodiments, it is preferable for the I component in ICtCp to be within [0, 1] and for Ct and Cp to be within [−0.5, 0.5]. If the input ICtCp values are outside those ranges, then they can be translated to these ranges using a simple shift and scaling operation. For example, in an embodiment, operations may be performed in the "ITP" color space. The ITP space is very similar to the ICtCp color scale, except for some offset and scaling operations, e.g., the Ct component is scaled by two for a more efficient internal representation.

Pyramid Filtering

In some embodiments, to be described in more detail later, the display tone-mapping within the color volume mapping block (e.g., 510) may be further improved by taking into consideration local contrast and details information of the input image. For example, a filtered intensity image is used to split the image into two layers: a filtered base layer and a detail layer. By applying the tone-mapping curve to the filtered base layer, and then adding back the detail layer to the result, the original contrast of the image can be preserved both globally as well as locally.

In an embodiment, this can be performed as a two-stage operation:
a) Generate a base layer (BL) to guide the mapping
b) Perform the tone-mapping In an embodiment, the generated base layer represents a spatially-blurred, edge-preserved, version of the original image. That is, it maintains important edges but blurs finer details. More specifically, generating the BL image may include:
- Creating an image pyramid with layers of lower resolutions, and saving each layer
- Starting with the layer of the lowest resolution, up-sample to higher layers to generate the base layer Example embodiments for creating the image pyramid and the base layer image have already been discussed as part of the pyramid down-sampling unit (230) and pyramid up-sampling (235).

Color Volume Mapping

Figure 6A:
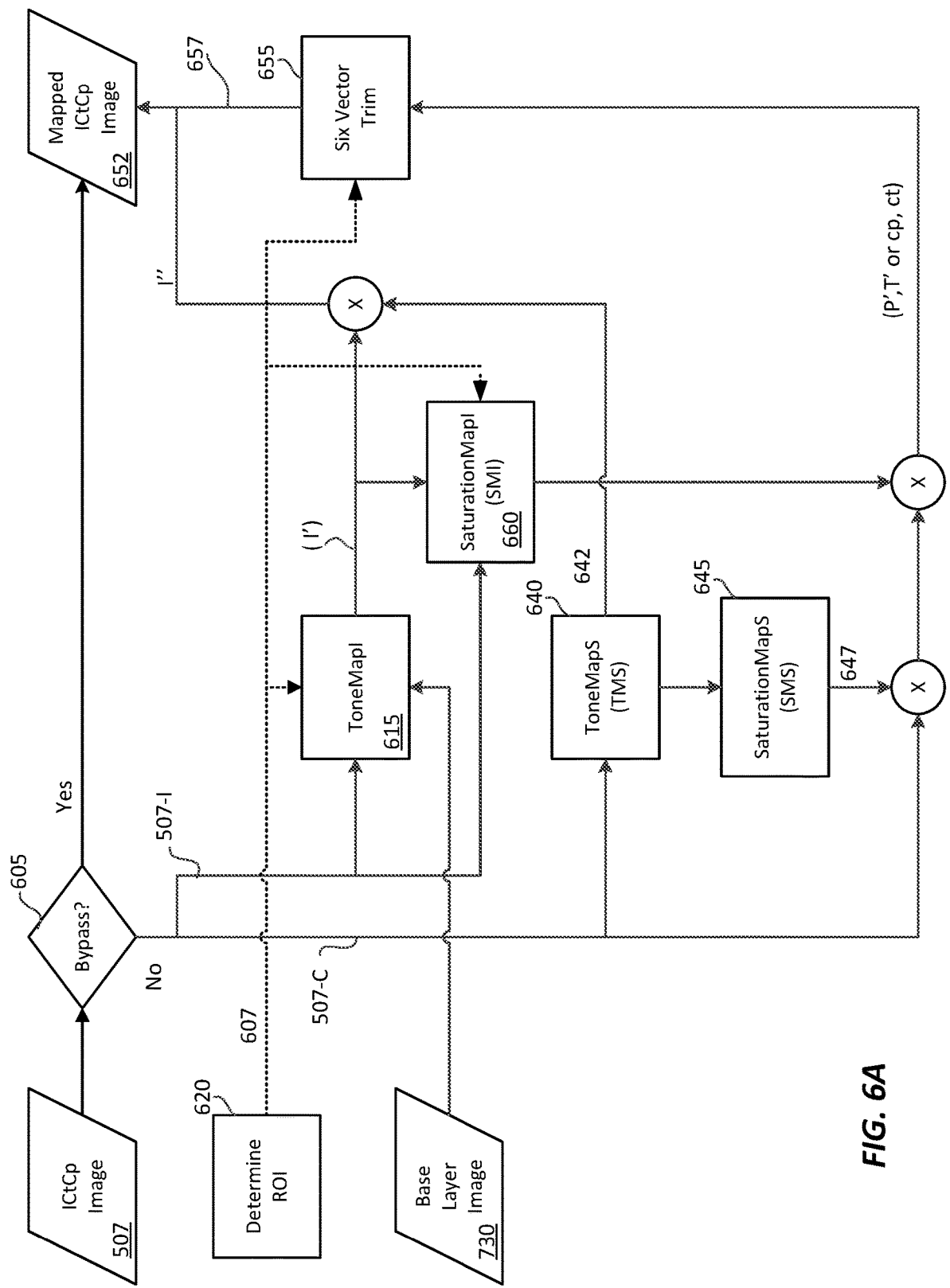
FIG. 6A and FIG. 6B depict an example processing pipeline for color volume mapping according to an embodiment of the present invention.
Figure 6B:
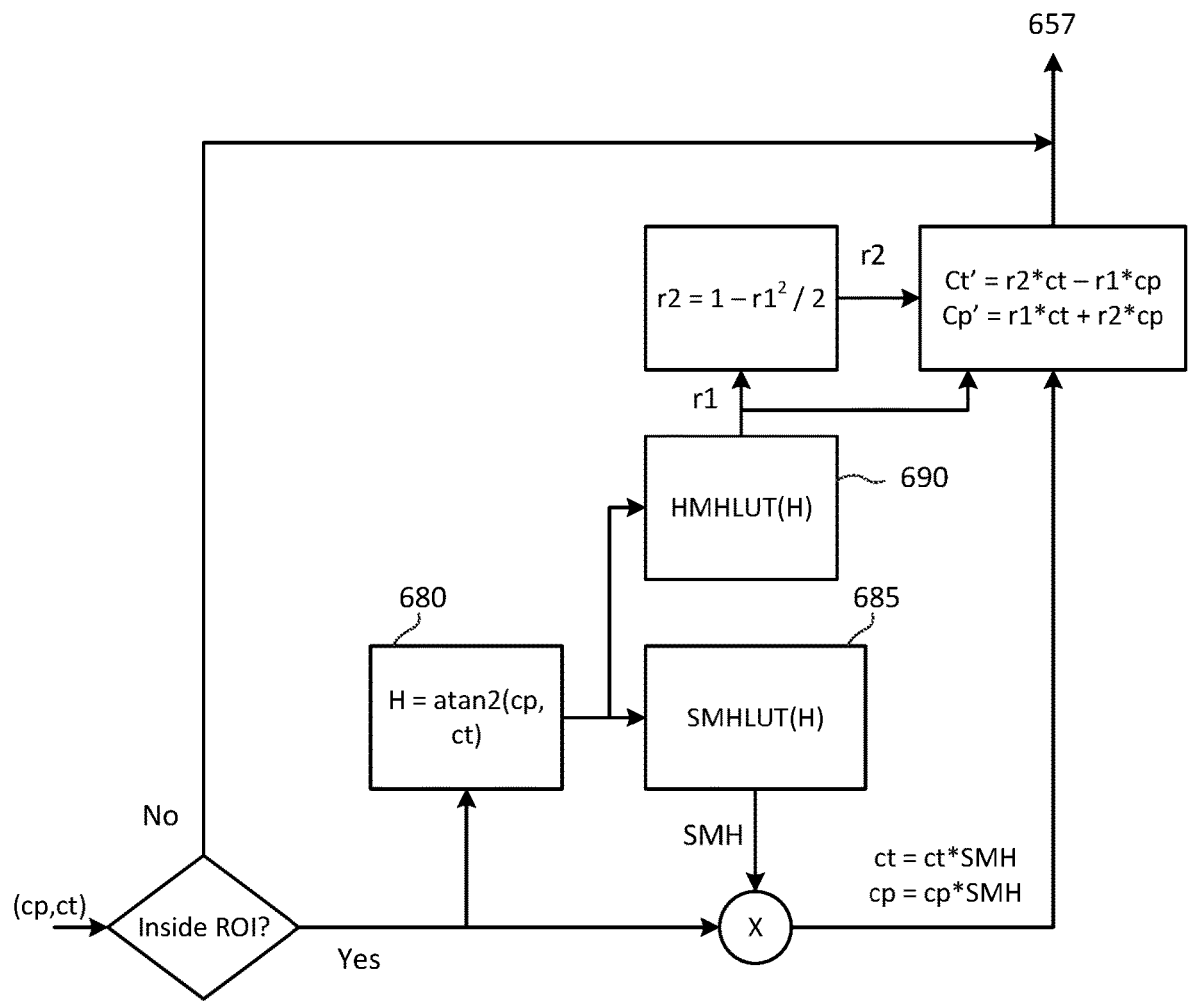

FIG. 6A and FIG. 6B depict an example processing pipeline for color volume mapping (510) according to an embodiment. The goal of the color volume mapping block is to adjust the range of both intensities and colors for presentation on a specified target display and viewing environment. Embodiments of this invention build upon previous display management techniques with the addition of the optional Pyramid Filtering operation. A novel detail preservation algorithm is performed, which resulted in the new "Pyramid Filtering" operation discussed in earlier.

The color volume mapping is primarily a function of four operations which adjust intensity and saturation while maintaining hue. ToneMapI (615) and SaturationMapI (660) make adjustments based on intensity, and ToneMapS (642) and SaturationMapS (645) make adjustments based on saturation. The hue, defined as the angle between P (Cp) and T (Ct), remains constant. However, to enable the local mapping, ToneMap1 is now a function of both the input intensity I as well as the pyramid filtered intensity $I_F$. Additionally, to ensure color accuracy with local mapping, the SaturationMapI is now a function of both the original intensity I as well as the tone mapped intensity I'.

$$S = \sqrt{T^2 + P^2},$$

$$I' = \text{ToneMap}I(I, I_F),$$

$$I'' = I' * \text{ToneMap}S(S),$$

$$P' = P * \text{SaturationMap}I(I, I') * \text{SaturationMap}S(S),$$

$$T' = T * \text{SaturationMap}I(I, I') * \text{SaturationMap}S(S), \tag{6}$$

An embodiment includes a novel Six Vector Trim module (655) to be described in more detail later.

As depicted in FIG. 6A, if according to the input metadata it appears that the characteristics of the target display match the characteristics of the reference display or the input (e.g., Bypass 605 is set to Yes), then the whole color volume mapping may be bypassed, and the input (507) is passed directly to the output (652). Otherwise, the intensity (507-I) and chroma components (507-C) of the input are passed into their perspective mapping pipelines. In some embodiments, special processing may be done for a certain region of interest (ROI) within each frame to be displayed. For example, a "determine ROI" unit (620) may determine whether pixel (x, y) of the input image is within a region of interest and whether parameters 607 are set to a default set if operations are outside an ROI, or, if inside the ROI, these control parameter (607) are adjusted by input metadata. Similarly, if outside the ROI, then, as depicted in FIG. 6B, certain processing steps may be completely bypassed for pixel regions outside of the ROI. For example, the ROI unit may detect the picture area within letterbox areas surrounding an input frame or an overlapping window on top of the active picture. In an embodiment, without limitation, the ROI unit may mark a region of pixels as:
- Primary region with trims to be mapped
- Primary region without trims to be mapped
- Secondary region (say, "letterbox" or an overlay on top of a letter box) to be mapped, set to black, or to be bypassed ToneMapI The ToneMapI block (615) applies a tone mapping to the intensity channel, based on the intensity I of the pixel as well as a function of the pyramid filtered pixel $I_F$. The ToneMapI function may comprise a variety of processing stages, including dynamic range reduction and ambient light adjustments.

Figure 6C:
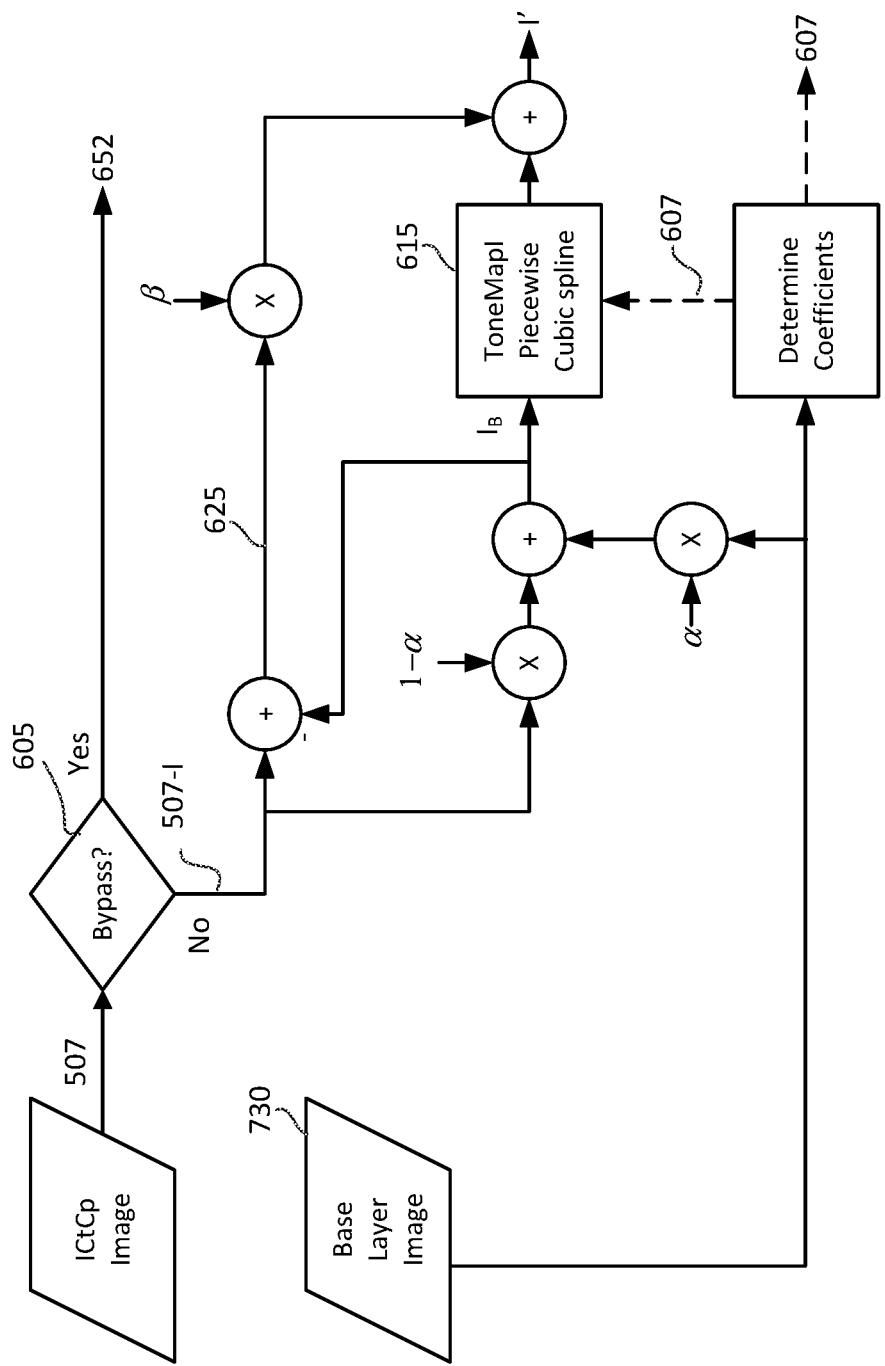
FIG. 6C depicts an example processing pipeline for adjusting color trims according to an embodiment of the present invention.

Dynamic Range Reduction performs the majority of the tone mapping operation. As depicted in FIG. 6C, the input $I_B$ to the tone-mapper is first calculated by interpolating between the original image I (705) and the pyramid filtered image $I_F$ (730) in order to allow some control over the strength of the local mapping:

$$I_B = \alpha * I_F + (1+\alpha) * I. \quad (7)$$

When $\alpha=0$, the tone-mapping is equivalent to a traditional global tone-mapping. In an embodiment, image $I_B$ is then mapped to output intensities ($I'_B$) via a tone-mapping curve which is dynamically calculated based on source metadata and the target configurations. Examples of such tone-mapping functions are described in U.S. Pat. No. 8,593,480, "Method and apparatus for image data transformation," by A. Ballestad and A. Kostin, and in WIPO Publication WO 2018/152063, "Tone curve mapping for high dynamic range images," by J. A. Pytlarz and R. Atkins, each one incorporated by reference.

Given difference image D (625), where $D=(I-I_B)$, an optional scaler $\beta$ on image D may be used to adjust the sharpening of the tone-mapped output $$I' = I'_B - I_B) * \beta, \quad (8)$$

where $I'_B$ denotes a tone-mapped version of $I_B$.

Conceptually, this algorithm applies the tone mapping operation only to large spatial regions of the image, leaving small spatial regions un-modified. The result is that some of the original local contrast of the image can be preserved in the highlight and shadow regions. Where there was no tone mapping, the operation has no effect, since there is no reason to restore contrast. For large flat regions the operation also has no effect. It is only small, tone mapped regions of the image where the operation aims to preserve contrast. To prevent unwanted halos the local mapping algorithm has minimal effect near large magnitude edges, where large changes of luminance can be made without causing visible halos. The content creator is given some degree of control over how much of the local mapping algorithm to apply, varying between none and full strength.

The tone curve may also be modified based on the strength of local mapping. The slop of the top and bottom parts of the mapping curve may be adjusted to be closer to a slope=1 with local mapping and blending based on the value of $\alpha$. This ensures there is enough room for detail to be added back without any clipping or crushing.

Ambient Light Correction adjusts the output luminance based on the viewing environment to maintain the visibility of detail in dark regions. This typically involves increasing the contrast in dark regions, with a corresponding reduction in contrast elsewhere in the image if necessary. The algorithm behind the ambient light compensation module is based on calculating a different PQ curve based on the ambient environment. At higher levels of adaptation, the just-noticeable-differences (JNDs) become larger in dark regions. By calculating a new PQ curve that models these larger JNDs, the ambient light algorithm can preserve the number of visible steps between varying degrees of adaptation to the surrounding environment. In addition to compensating for the surround illumination, this module also compensates for estimated screen reflections. The ambient light may be determined from one or more ambient light sensors installed on the display.

Examples of such mapping are described in WIPO Publication WO 2018/119161, "Ambient light-adaptive display management," by J. A. Pytlarz et al., and U.S. Provisional Patent Application Ser. No. 62/790,058, filed on Jan. 9, 2019, "Display management with ambient light compensation," by R. Atkins et al. This stage can also be used to adjust for user-preferences, such as contrast adjustment, brightness adjustment, and the like.

Returning to FIG. 2B, display mapping (210) may include both global tone-mapping and precision mapping, while display mapping (212) may include only global tone mapping All of these processing steps are controlled by flags and parameters (607), provided either by the display management control layer (215) or metadata included in the bitstream.

SaturationMapI

The SaturationMapI block (660) applies a saturation mapping to the chroma channels (e.g., T and P), based on the intensity of the pixel and the output of ToneMapI (615). The mapping is applied in three stages:

SaturationMapI=SaturationScale*MesopicPreservation*SaturationTrim

Stage 1: Saturation Preservation Scale adjusts the saturation to account for the change to the intensity. As the intensity of colors is reduced, the saturation is also decreased accordingly to maintain the color's appearance or balance. The amount to adjust the saturation is calculated as a ratio dependent on the intensity before and after the tone mapping. Note that additional clamping and limits are omitted for clarity.

$$SaturationScale = \frac{(I'-1)^3 + 1}{(I-1)^3 + 1}. \quad (9a)$$

In general, equation (9) may be expressed as $$SaturationScale = \frac{f_S(I')}{f_S(I)}, \quad (9b)$$

where the $f_s(I)$ function is a monotonically increasing function of intensity, preferably with a liner mapping for midtones, but non-linear mapping for darks and highlights, similar to a traditional sigmoid function.

Stage 2: Mesopic Preservation and Soft Crush Scale further adjusts the saturation when mapping to a higher black level. The mesopic preservation ($c_4$) models the perceptual loss of color saturation in low luminance pixels in the source content and reproduces it at the higher luminance level. Without this modification, dark details can appear more saturated when mapped to a display with higher black level. The soft crush ($c_2$) is a gamut mapping saturation adjustment. It reduces the saturation of pixels that are close to the min of the target display in order to bring them back into gamut. Without this modification, dark pixels may be out of gamut and may clip to highly saturated objectionable colors. Note that additional clamping and limits are omitted for clarity.

$$c_1 = \frac{I' - T_{min}}{T_{min} - S_{min}}, \quad (10)$$

$$c_2 = \text{sign}(c_1 - 1) * (c_1 - 1)^2 + 1,$$

$$c_3 = \frac{I * 4095 - 25}{900 - 25},$$

$$c_4 = \text{sign}(c_3 - 1) * (c_3 - 1)^2 + 1,$$

$$MesopicPreservation = c_2 * c_4.$$

Stage 3: Saturation Trim Scale allows a content creator to further modify the saturation from the automatic mapping to better achieve their creative intent. This is simply calculated from the SaturationGain value provided in metadata, which, in an embodiment, has a range in [−0.5, 0.5] and a typical value of approximately 0.05.

SaturationTrim=1+SaturationGain.

ToneMapS

The ToneMapS block (640) adjusts the intensity channel (I') of the tone-mapped input based on saturation of the chroma channels. The amount of adjustment is controlled by two stages determined by two coefficients $c_1$ and $c_2$. Note that additional clamping has been omitted for clarity.

$$S = \sqrt{T^2 + P^2},$$

ToneMapS=$(1+S^3 * c_1)*(1+S*c_2)$, (12)

Note that in other embodiments, ToneMapS may denote any monotonically increasing function of S for S>0.

In an embodiment, the $c_1$ and $c_2$ coefficients are computed as follows.

Stage 1: Primary Saturation modifies the brightness of saturated colors according to the difference between the primaries of source and target displays. This causes highly saturated colors to be darkened slightly, which helps to preserve color saturation and textures in bright, saturated, color regions. The saturation of the red primary of the source display is calculated first, using the ITP color space. Then a coefficient $c_1$ is calculated as a ratio of the intensity of the red primary of the target and the source, accounting for the additional tone mapping performed by ToneMapI. The coefficient $c_1$ is also further scaled by the cubed saturation of the red primary, so that each pixel is represented as a normalized ratio of the saturation of the pixel to the saturation of the red primary. Note that the actual implementation includes additional clamping to limit the range of each of the values and to avoid divisions by zero—the equations below omit the clamping for clarity.

$$S_{RedS} = \sqrt{T^2_{RedS} + P^2_{RedS}},$$

$$c_1 = \left(\frac{I_{RedT}}{ToneMapI(I_{RedS})} - 1\right) * \frac{1}{S^3_{RedS}}.$$

(13)

Stage 2: ChromaWeight Trim allows a content creator to further modify the brightness of saturated colors from the automatic mapping to better achieve their creative intent. This is simply calculated by scaling the ChromaWeight value provided in metadata.

$c_2$=ChromaWeight*4. (14)

ChromaWeight ranges in [−0.5, 0.5], with a typical value of −0.05.

SaturationMapS

The SaturationMapS block (645) applies a saturation mapping to the P and T channels, based on the saturation of the chroma channels. The amount to adjust saturation is controlled by two stages, determined by two coefficients $c_1$ and $c_2$. Note that additional clamping has been omitted for clarity.

$$S = \sqrt{T^2 + P^2}$$

SaturationMapS=$(1+S^3 * c_1)*(1+S*c_2)$. (15)

In an embodiment, the $c_1$ and $c_2$ coefficients are computed as follows.

Stage 1: Primary Saturation modifies the saturation according to the difference between the primaries of source and target displays. This causes highly saturated colors to be desaturated slightly, which helps to preserve hue and textures in bright, saturated, color regions. The saturation of the red primary of the source display and target displays are calculated first, using the ITP color space. Then a coefficient $c_1$ is calculated as a ratio of the saturation of the red primary of the target and the source, accounting for the additional desaturation performed by SaturationMapI. The coefficient $c_1$ is also further scaled by the cubed saturation of the red primary, so that each pixel is represented as a normalized ratio of the saturation of the pixel to the saturation of the red primary. Note that the actual implementation includes additional clamping to limit the range of each of the values and to avoid divisions by zero—the equations below omit the clamping for clarity.

$$S_{RedS} = \sqrt{T^2_{RedS} + P^2_{RedS}},$$

$$S_{RedT} = \sqrt{T^2_{RedT} + P^2_{RedT}},$$

$$c_1 = \left(\frac{S_{RedT}}{S_{RedS} * SaturationMapI(I_{RedS})} - 1\right) * \frac{1}{S^3_{RedS}}.$$

(16)

Stage 2: Chroma-Weight Trim allows a content creator to further modify the mapping of saturated colors from the automatic mapping to better achieve their creative intent. This is simply calculated by scaling the ChromaWeight value provided in metadata (e.g., see equation (14)).

$c_2$=ChromaWeight*3. (17)

Six Vector Trim

The Six Vector Trim block (655) allows a content creator to modify both the hue and saturation of specific colors to better achieve their creative intent when mapping to displays with lower dynamic range. As used herein, the term "trims" denotes controls for a content creator to perform additional manual modifications to the tone curve to obtain the desired creative intent. Trims-related metadata may include such parameters as: the maximum brightness value of a target display, Slope-Offset-Power parameters for tone-curve manipulation, and weights to adjust the effects of saturation gain and other chroma-related parameters.

The steps, also depicted in FIG. 6B, are as follows:

1. In block 680, calculate the hue angle of each pixel $$H = \arctan\left(\frac{cp}{ct}\right).$$

(18)

where ct and cp denoted the modified chroma values from the processing depicted in FIG. 6A.

2. In blocks 685 and 690, interpolate into two small LUTs (3 bit) using the hue angle as index

SMH=SMHLUT(H)

$r_1$=HMHLUT(H)

$r_2 = 1 - r_1^2/2$ (19)

Assuming His between 0 and 360 degrees, in an embodiment, the hue adjustment (r1) and saturation adjustment (SMH) may be computed as follows:

```
kH = floor( H << 3 )
aH = ( H << 3 ) - kH
SMH = SMHLUT [ kH ] * ( 1 - aH ) + SMHLUT [ kH + 1 ] * aH
r1 = HMHLUT [ kH ] * ( 1 - aH ) + HMHLUT [ kH + 1 ] * aH
``` where, SMHLUT[j] and HMHLUT[j], j=0, 1, . . . , 7, are look-up tables with trim values provided by the colorist as part of the input metadata.

3. Finally, the output chroma components Ct' and Cp' (657) of the tone-mapped output (652) are computed as:

$$Ct'=SMH*(ct*r_2-cp*r_1)$$

$$Cp'=SMH*(ct*r_1+cp*r_2) \quad (20)$$

The two LUTs are provided by metadata and consist of the desired modification for each of six hues. The hue of each pixel, calculated by the four-quadrant arc-tangent of the chroma channels, is used to interpolate into this table to find the amount of hue and saturation modification to apply. The LUT is intended for one or more specific luminance levels. Before the interpolation, the LUT is modified based on the actual luminance level of the intended target display, in the same way as the other trims.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to image transformations for images with high dynamic range, such as those described herein. The computer and/or IC may compute any of a variety of parameters or values that relate to the display management of HDR video processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to the display management of HDR video as described above by executing software instructions in a program memory accessible to the processors. The invention may also be provided in the form of a program product. The program product may comprise any tangible and non-transitory medium which carries a set of computer-readable signals comprising instructions which, when executed by a data processor, cause the data processor to execute a method of the invention. Program products according to the invention may be in any of a wide variety of tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the display management of HDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for display management, the method comprising:
    accessing a first image in a first dynamic range and a first spatial resolution, the first image comprising intensity pixels and chroma;
        applying a tone-mapping function to the intensity pixels of the first image to generate corresponding intensity pixels (I') of a tone-mapped image in a target dynamic range, wherein the target dynamic range is different than the first dynamic range;
        computing a saturation metric for pixels of the first image based on values of the chroma pixels in the first image;
        computing saturation-mapping-intensity (SMI) scaler based on corresponding pixel intensity values in the first image and the tone-mapped image, wherein computing the SMU scaler comprises computing:

$$SaturationScale = \frac{f_S(I')}{f_S(I)},$$

wherein SaturationScale denotes the SMI scaler, I denotes an intensity pixel value in the first image, I ' denotes a corresponding intensity value in the tone-mapped image, and the $f_s(I)$ function comprises a monotonically increasing function of intensity;
        computing a tone-mapping-saturation (TMS) scaler based on a first function of the saturation metric of the chroma pixels in the first image;
        computing a saturation-mapping-saturation scaler (SMS) based on a second function of the saturation metric of the chroma pixels in the first image;
        multiplying the TMS scaler with the intensity pixels of the tone-mapped image to generate output intensity pixels (I");

multiplying the SMS and SMI scalers with the chroma pixels of the first image to generate intermediate chroma pixels; and generating an output image comprising the output intensity pixels and output chroma pixels, wherein the output chroma pixels comprise the intermediate chroma pixels.

2. The method of claim 1, wherein generating the TMS scaler ToneMapS comprises computing:

$$S=\sqrt{T^2+P^2},$$

$$\text{ToneMap}S=(1+S^3{}^*c_1)^*(1+S^*c_2),$$

wherein S denotes the saturation metric for chroma pixel values T and P, $c_1$ is a variable computed based on differences between the first dynamic range and the target dynamic range, and $C_2$ is calculated based on metadata.

3. The method of claim 1, wherein $$SaturationScale = \frac{(I'-1)^3+1}{(I-1)^3+1}.$$

4. The method of claim 1 wherein generating the SMS scaler SaturationMapS comprises computing:

$$S=\sqrt{T^2+P^2},$$

$$\text{ToneMap}S=(1+S^3{}^*c_1)^*(1+S^*c_2),$$

wherein S denotes the saturation metric for chroma pixel values T and P, $c_1$ is a variable computed based on differences between the first dynamic range and the target dynamic range, and $c_2$ is calculated based on metadata.

5. The method of claim 1, wherein generating the intermediate chroma pixels comprises:

$$ct=T^*SMI^*SMS$$

$$cp=P^*SMI^*SMS$$

where T and P denote values of the chroma pixels of the first image, and ct and cp denote the intermediate chroma pixels.

6. The method of claim 1, wherein generating the output chroma pixels further comprises:
  receiving trim metadata as part of the first image;
  receiving a region of interest in the first image;
  for pixels in the first image belonging to the region of interest:
    computing a hue value of the intermediate chroma pixels;
    computing a saturation-map-hue (SMH) scaler based on the hue value and the trim metadata;
    computing a hue-map value (r1) based on the hue value and the trim metadata; and
    generating the output chroma pixels based on the hue-map value, the SMH scaler and the intermediate chroma pixels.

7. The method of claim 6, wherein generating the output chroma pixels comprises computing:

$$r2=1-r1^2/2;$$

$$ct=ct^*SMH;$$

$$cp=cp^*SMH;$$

$$ct'=r2^*ct-r1^*cp;$$

$$Cp'=r1^*ct+r2^*cp,$$

wherein r1 denotes the hue-map value, and Ct' and Cp' denote the output chroma pixels.

8. The method of claim 1, wherein the intensity pixels of the first image are generated as $$I_B=\alpha^*I_F+(1-a)^*I,$$

wherein α comprises a value between 0 and 1, I denotes an intensity pixel value of an input image and $I_F$ denotes a corresponding intensity pixel value of a filtered base layer image generated using the input image, pyramid down-sampling, and pyramid up-sampling.

9. The method of claim 8, wherein given a scaler 13 between 0 and 1, generating intensity pixel values of the output image comprises:

$$I'=I'_B+(I-I_B)^*\beta,$$

where $I'_B$ denotes pixel intensity of a tone-mapped version of $I_B$.

10. The method of claim 8, wherein pyramid down-sampling generates a pyramid representation of the input image using N pyramid layer images, where N is at least two, wherein the first pyramid layer image has a lower spatial resolution than the spatial resolution of the input image, and the k-th layer pyramid image, for k=2, ... , N, has a lower spatial resolution than the k-1-th layer pyramid image.

11. The method of claim 10, wherein generating the intensity pixel values of the filtered base layer image comprises:
  generating a set of edge-filter coefficient images Ima(1) and Imb(1) (710) based on the N pyramid layer images;
  up-sampling the set of edge-filter coefficient images Ima(1) and Imb(1) to match the spatial resolution of the input image and generate a set of up-sampled edge-filter coefficient images ImaU(1) and ImbU(1) (712); and
  generating the intensity pixel values of the filtered base layer as:

$$I_F=ImaU(1)^*I+ImbU(1).$$

12. The method of claim 11, wherein generating Ima(1) and Imb(1) comprises:
  generating Ima(N) and Imb(N) using an edge filter and P(N), wherein P(N) denotes the N-layer pyramid image with the lowest spatial resolution;
  generating ImaU(N) and ImbU(N) by up-scaling Ima(N) and Imb(N) to match the spatial resolution of the (N−1) pyramid layer image;
  for i=N−1 to 2:
    generating S(i)=ImaU(i+1)*P(i)+ImbU(i+1), wherein P(i) denotes the i-th layer pyramid image;
    generating Ima(i) and Imb(i) using the edge filter, S(i) and P(i); and
    computing S(1)=ImaU(2)*P(1)+ImbU(2); and
  generating Ima(1) and Imb(1) using the edge filter, S(1) and P(1).

13. The method of claim 12, wherein generating Ima(i) and Imb(i) using the edge filter, and S(i) and P(i) comprises:
  generating images P2(i)=$P^2$(i) and PS(i)=P(i)*S(i);
  convolve P2(i) with filter H to generate P2out;
  convolve P(i) with the filter H to generate Pout;
  convolve S(i) with the filter H to generate Sout;
  convolve PS(i) with filter H to generate PSout;
  compute:

$$Pvar=P2out-Pout^2,$$

$$PScov=PSout-Sout^*Pout,$$

$Ima(i) = PScov/(Pvar + PW(i))$, $Imb(i) = Sout - Ima(i) * Pout$, wherein PW(i) denotes a set of weights received via metadata.

14. An apparatus comprising a processor and configured to perform the method recited in claim 1.

15. A non-transitory computer-readable storage medium having stored thereon computer-executable instructions for executing a method with one or more processors in accordance with claim 1.

* * * * *

UNITED STATES PATENT AND TRADEMARK OFFICE
CERTIFICATE OF CORRECTION

| | |
|---|---|
| PATENT NO. | : 11,803,948 B2 |
| APPLICATION NO. | : 17/605557 |
| DATED | : October 31, 2023 |
| INVENTOR(S) | : Atkins et al. |

It is certified that error appears in the above-identified patent and that said Letters Patent is hereby corrected as shown below:

In the Claims

Column 16, Line 35, In Claim 1, delete "chroma;" and insert --chroma pixels;-- therefor Column 16, Line 44, In Claim 1, after "computing", insert --a-- therefor Column 16, Line 47, In Claim 1, delete "SMU" and insert --SMI-- therefor Column 16, Line 55, In Claim 1, delete "I '" and insert --I'-- therefor Column 17, Line 17, In Claim 2, delete "$C_2$" and insert --$c_2$-- therefor Column 17, Line 65, In Claim 7, delete "$ct'=r2*ct–r1*cp;$" and insert --$Ct' = r2 * ct - r1 * cp;$-- therefor Column 18, Lines 5-6, In Claim 8, delete "$I_B=\alpha*I_F+(1–a)*I,$" and insert --$I_B = \alpha * I_F + (1 - \alpha) * I,$-- therefor Column 18, Line 12, In Claim 9, delete "13" and insert --$\beta$-- therefor Column 18, Line 31, In Claim 11, after "Imb(1)", delete "(710)"

Column 18, Line 35, In Claim 11, delete "ImbU(1) (712);" and insert --ImbU(1);-- therefor Signed and Sealed this
Thirtieth Day of January, 2024

*Katherine Kelly Vidal*
Katherine Kelly Vidal
*Director of the United States Patent and Trademark Office*